(12) United States Patent
Nakashima et al.

(10) Patent No.: US 6,367,682 B1
(45) Date of Patent: Apr. 9, 2002

(54) AIRBAG INFLATOR AND AN AIRBAG APPARATUS

(75) Inventors: Yoshihiro Nakashima; Nobuyuki Katsuda, both of Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/072,032

(22) Filed: May 6, 1998

(51) Int. Cl.⁷ ............................................... B23K 20/12
(52) U.S. Cl. ..................... 228/114; 228/114.5; 228/125
(58) Field of Search ............................. 228/114, 114.5, 228/125, 2.3, 19, 265

(56) References Cited

U.S. PATENT DOCUMENTS

| | | | | |
|---|---|---|---|---|
| 3,452,421 A | * | 7/1969 | Cheng et al. | 228/114.5 |
| 3,504,425 A | * | 4/1970 | Sutovsky et al. | 228/114.5 |
| 4,561,675 A | * | 12/1985 | Adams et al. | 280/734 |
| 5,603,448 A | * | 2/1997 | Woerner et al. | 228/114.5 |

FOREIGN PATENT DOCUMENTS

| | | | | |
|---|---|---|---|---|
| DD | 266050 | * | 3/1989 | 228/114.5 |
| JP | 8-090259 A | | 4/1996 | |
| JP | 9-207705 A | | 8/1997 | |
| JP | 9-226509 A | | 9/1997 | |
| JP | 7-256470 A | | 10/1999 | |

* cited by examiner

Primary Examiner—Samuel M. Heinrich

(57) ABSTRACT

An airbag inflator, whose overall size is reduced and which is not adversely affected by the removed weld burrs and can effectively utilize the shape of the projecting weld burrs, is provided in the airbag inflator, in which the interior of the housing having gas discharge ports, is divided into two or more chambers by partition walls that are friction-welded together and define an ignition means accommodating chamber on the inner side thereof, the shape of the weld burrs formed on the ignition means accommodating chamber side during the friction welding is controlled by the weld burr restriction member in such a way as to obtain a space to accommodate ignition means.

13 Claims, 4 Drawing Sheets

AIRBAG INFLATOR AND AN AIRBAG APPARATUS

BACKGROUND OF THE INVENTION

1. Field of the Invention

The present invention relates to an airbag inflator and a gas generator for airbag apparatuses for alleviating impacts on passengers at time of collision of vehicles, and more specifically to an airbag inflator, in which the interior of its housing is divided into two or more chambers by a partition wall joined by friction welding.

2. Prior Art

A conventional airbag inflator has, accommodated in its housing, with a gas discharge port(s), an ignition means actuated and ignited when a vehicle receives an impact, and a gas generating means that generates a gas when the ignition means is activated. Generally, a diffuser shell, having the gas discharge ports, and a closure shell, closing the diffuser shell together, form the housing of the airbag inflator. The diffuser shell and the closure shell are joined by a variety of welding methods, such as plasma welding, friction welding, projection welding, electron beam welding, laser welding and TIG (tungsten inert gas) welding. When the housing, whose interior is divided into two or more chambers by a partition wall, is used to form the airbag inflator, in particular, the friction welding is the most desired of the above welding methods because it can join the diffuser shell and the closure shell of the housing as well as the partition walls in a single operation.

The friction welding melts the members to be joined by friction heat to weld and join them, and thus an excess part of the melted material usually flows out, forming projecting weld burrs at the welded portion. In designing the housing, therefore, a space needs to be secured in the housing beforehand to accommodate the projecting weld burrs. In the airbag inflator whose partition walls defining chambers in the housing are joined by friction welding, a space that is not necessary for the operation of the airbag inflator must be provided for the protruding weld burrs. The protruding weld burrs constitute an obstacle in the way of reducing the size of the airbag inflator.

This space, unnecessary for the functioning of the airbag inflator, may be reduced by removing, where possible, the protruding weld burrs formed by the friction welding. The weld burrs, even if scraped off, may remain in the housing and interfere with the normal operation of the airbag inflator. To remove the weld burrs requires an additional process, reducing the efficiency in the manufacture of the airbag inflator.

The conventional airbag inflators are classified into two groups, i.e., electrical ignition type and a mechanical ignition type. The electrical ignition type airbag inflator uses heat produced by electric current to trigger an igniter to ignite a transfer charge, whereas the mechanical ignition type airbag inflator uses a plunger launched from a mechanical sensor to pierce and activate a detonator and thereby burn the transfer charge. Of these, the mechanical ignition type airbag inflator has the advantage of not requiring electric wiring and of low cost.

The mechanical ignition type airbag inflator generally accommodates ignition means, a gas generating agent, and a coolant/filter provided in the housing having gas discharge ports. The ignition means includes a mechanical sensor that launches a plunger upon detecting an impact by mechanical means; a detonator that fires when pierced by the plunger; and a transfer charge ignited by the flame of the detonator and burns the gas generating agent. The gas generating agent, when ignited and burned by the flame of the transfer charge, generates a gas, which is cooled and purified by the coolant/filter. In order to shoot the plunger from the mechanical sensor such that it precisely pierces the detonator, a correct positional and directional relationship must be established between the mechanical sensor and the detonator. Hence, the conventional mechanical ignition type airbag inflator requires the positioning of the mechanical sensor and the detonator, and this positioning process is an obstacle to the efficient manufacture of the airbag inflator.

SUMMARY OF THE INVENTION

It is, therefore an object of this invention to provide an airbag inflator which can solve the problems experienced in the conventional airbag inflators and can obviate the need for the space in the housing for weld burrs formed by friction welding and also the need for the process of removing the weld burrs, thereby reducing the overall size of the airbag inflator and preventing the airbag inflator from being affected by the removed weld burrs. It is also an object of this invention to provide an airbag inflator that can effectively utilize the protruding weld burrs.

The airbag inflator of this invention is characterized in that the shape of the projecting weld burrs formed on the partition wall on the side of an ignition means accommodating chamber, which is defined inside of the partition wall, is controlled by the weld burr restriction member during the friction welding.

More specifically, the airbag inflator of this invention comprising a housing having gas discharge ports and partition walls, joined by friction welding, which divide the interior of the housing into two or more chambers, the inner defining an ignition means-accommodating chamber, is characterized in that the shape of protruding weld burrs formed by the friction welding on the side of the ignition means accommodating chamber is controlled by a weld burr restriction member such that a space to accommodate an ignition means can be provided.

The above airbag inflator may be either a mechanical ignition type airbag inflator that produces a gas upon detecting an impact exclusively by a mechanical means or an electrical ignition type airbag inflator that is actuated upon receiving an electrical signal transmitted from a sensor that detects an impact, as long as the interior of the housing with gas discharge ports is divided into two or more chambers by the partition walls that are joined together by friction welding and which define the ignition means accommodating chamber on the inner side thereof.

The mechanical ignition type airbag inflator has ignition means, a gas generating agent, and a coolant/filter all installed in the housing with gas discharge ports. The ignition means includes a mechanical sensor that launches a plunger upon detecting an impact; a detonator which, when pierced by the plunger, ignites and burns; and a transfer charge that is ignited and burned by the flame of the detonator. The gas generating agent is ignited and burned by the flame of the transfer charge. The coolant/filter cools and purifies the produced gas. The electrical ignition type airbag inflator, on the other hand, is installed within the housing, with gas discharge ports and ignition means, which includes an igniter triggered by an electrical signal transmitted from a sensor that has detected an impact and a transfer charge that is ignited and burned by activation of the igniter, a gas generating agent that is ignited and burned by the flame of the transfer charge to produce a gas, and a coolant/filter that cools and purifies the produced gas.

As to the control of the shape of the protruding weld burrs on the ignition means accommodating chamber side, the protruding weld burrs may be so shaped that it can position, and/or block rotation of, a member which constitutes the ignition means in the ignition means accommodating chamber and that is installed in a place where the weld burrs project. This applies to a case where the mechanical ignition type airbag inflator, particularly, the ignition means installed in the ignition means accommodating chamber, includes a mechanical sensor that launches a plunger upon detection of an impact, a detonator that fires when pierced by the plunger, and a transfer charge ignited by the flame of the detonator. If the member installed in a place, where the weld burrs project, is a mechanical sensor, the shape of the protruding weld burrs is controlled beforehand so that the detonator can reliably be pierced by the plunger of the sensor, without providing a separate means for positioning the sensor.

Such a rotation prevention and/or positioning means may be realized by forming a positioning portion on the outer circumferential surface of the member which is installed in a place where the weld burrs project; and by controlling through the weld burr restriction member the shape of the protruding weld burrs formed on the partition walls on the ignition means accommodating chamber side into a shape such that the positioning portion of the member to be installed in a place where the weld burrs project can be fitted in the protruding weld burrs. The engagement between the positioning portion and the weld burrs can be achieved by providing them with matching recesses and projections and then fitting them together, or by forming the positioning portion and the weld burrs into complementary polygonal shapes and then fitting them together.

The control of the shape of the protruding weld burrs formed on the ignition means accommodating chamber side of the partition walls may be achieved, for example, by inserting the weld burr restriction member into the ignition means accommodating chamber which define the ignition means accommodating chamber on its inner side while performing the friction welding of the partition walls and then, removing the weld bur restriction member after the friction welding is finished. The weld burr restriction member may be formed integrally with the friction welding table used in the process of friction-welding the housing.

The housing is formed by joining the diffuser shell having gas discharge ports and the closure shell having a sensor accommodating opening. This Joining is done by friction welding.

The gas generating agent can be known gas generating agents such as azide-containing agents and non-azide-based agents. The azide gas generating agents include inorganic azide that has been in wide use such as an equivalent compound of soda azide and copper oxide, particularly the one based on sodium azide. The non-azide gas generating agents include compounds having, as main components, an organic nitrogen compound, such as tetrazole, triazole and their metal salts, and an oxygen containing oxidizing agent such as alkali metal nitrate; and compounds which use triaminoguanidine nitrate, carbohydrazide and nitroguanidine as a fuel and nitrogen source and also nitrate, chlorate and perchlorate of alkali metal or alkaline earth metal as an oxidizing agent. In terms of safety, it is more advantageous to use a non-azide gas generating agent.

The coolant/filter has a function of removing combustion residues produced as a result of combustion of the gas generating agent and also cooling the combustion gas. The coolant/filter may be formed of annular laminated layers of wire mesh made of stainless steel, such as SUS304, SUS310S, and SUS316 (JIS Standard) being compression-molded. The coolant filter may also be a combination of the conventional filter and coolant that are in wide use.

In the airbag inflator of this invention, an impact triggers the ignition means to ignite the transfer charge, whose flames in turn ignite and burn the gas generating agent, which produces a gas. The generated gas is cooled and purified by the coolant/filter before being injected through the gas discharge ports of the housing into the airbag.

Further, the above airbag inflator may be combined with an airbag to be inflated by introducing a gas generated by the airbag inflator, and a module case containing the airbag to form an airbag apparatus. This airbag apparatus is installed and secured in an appropriate location in a vehicle, such as steering wheel and dashboard.

DESCRIPTION OF THE PREFERRED EMBODIMENT

A preferred embodiment of this invention will be described by referring to the accompanying drawings.

Figure 1:
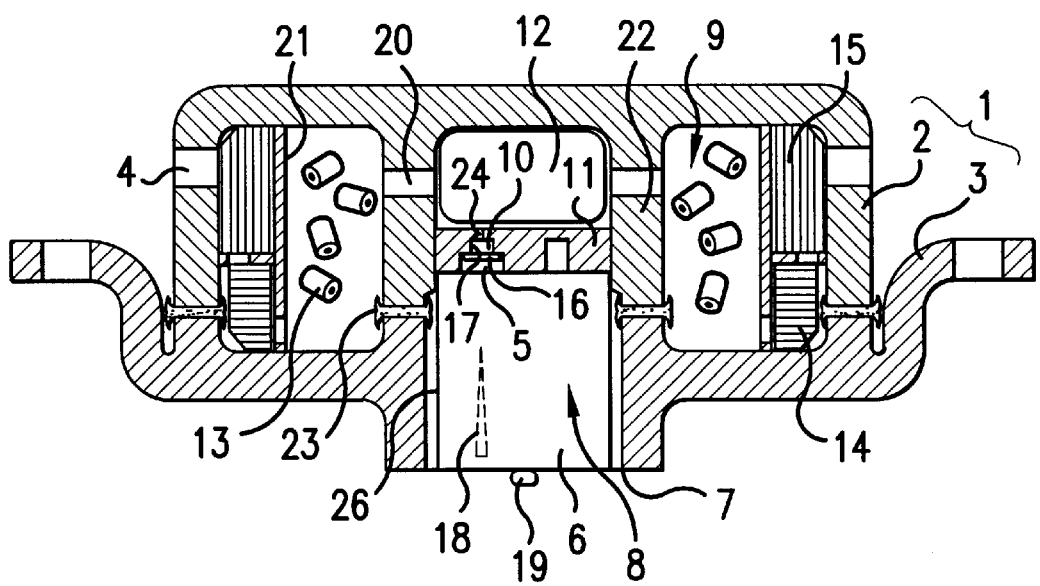
FIG. 1 is a vertical cross section of an airbag inflator as one embodiment of this invention.
Figure 2:
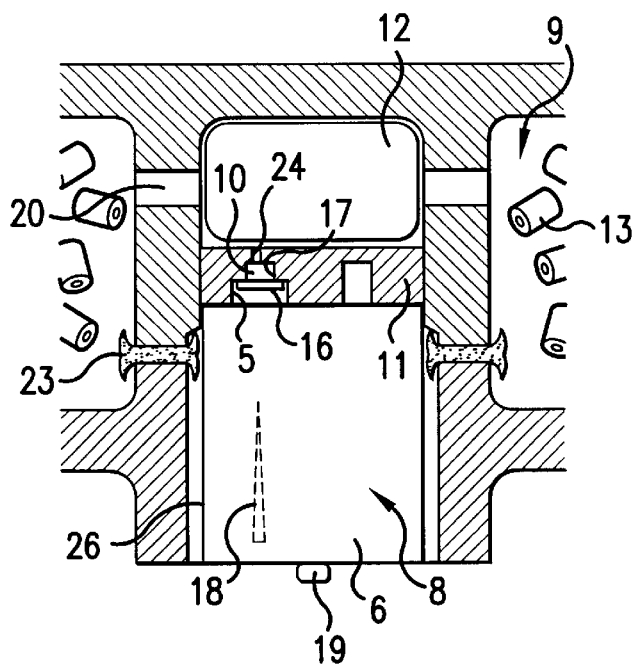
FIG. 2 is an enlarged essential-part vertical cross section showing the ignition means of the airbag inflator of this invention.
Figure 3:
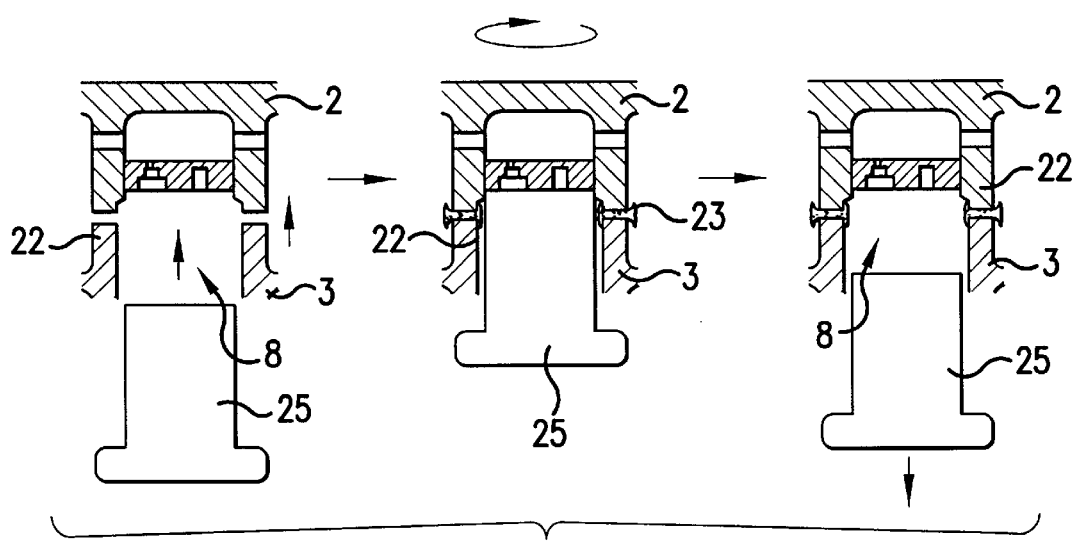
FIG. 3 is an enlarged essential-part cross section showing how the weld burrs are controlled.
Figure 4:
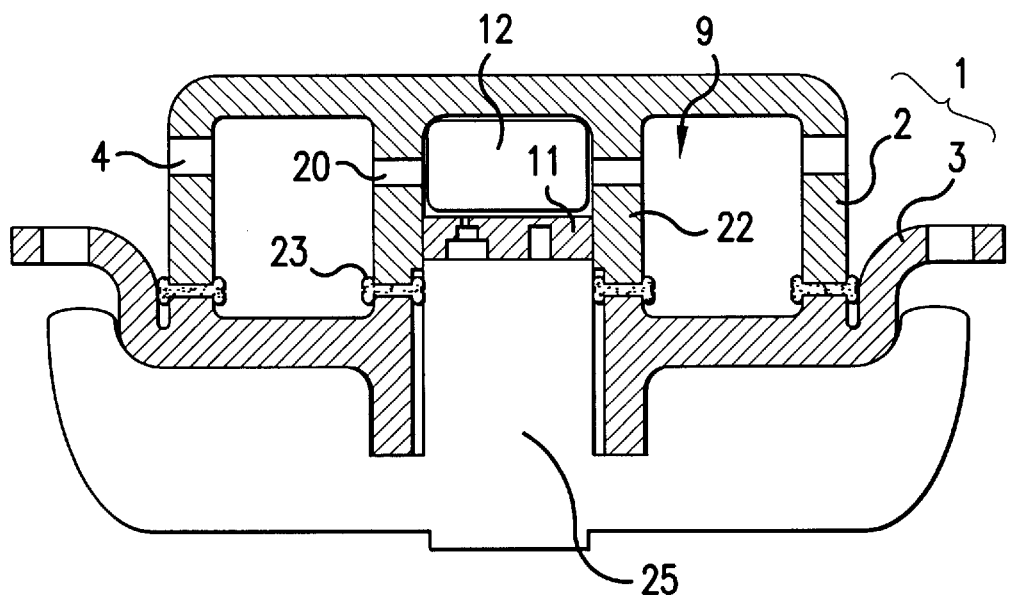
FIG. 4 is an enlarged essential-part cross section showing the weld burr restriction member formed integrally with a friction welding receiving table.
Figure 5A:
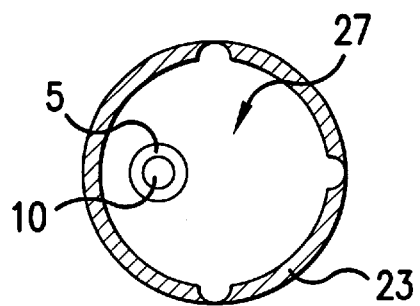
FIG. 5 is an essential-part plan view showing the shape of the projecting weld burrs.
Figure 5B:
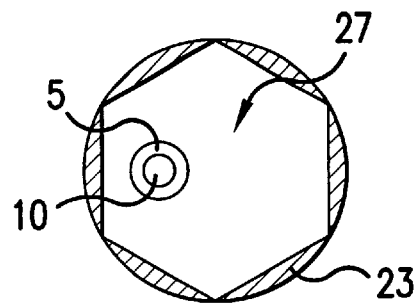
Figure 6:
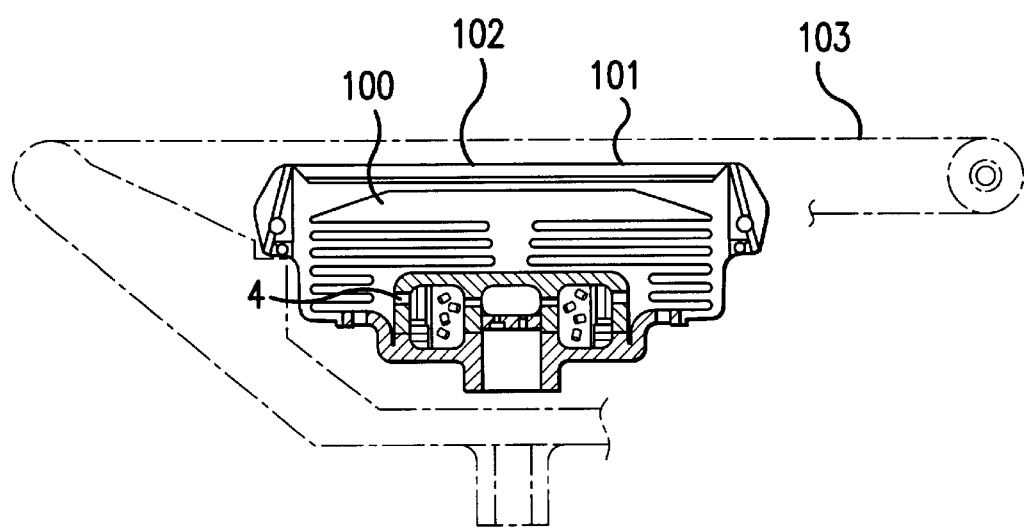
FIG. 6 is a schematic view showing the construction of the airbag apparatus.

The airbag inflator shown in this embodiment is a mechanical ignition type airbag inflator. FIG. 1 is a vertical cross section of the airbag inflator as one embodiment of this invention. FIG. 2 is an enlarged essential-part vertical cross section showing the partition walls of the airbag inflator of this invention in a joined state. FIG. 3 is an enlarged essential-part cross section showing how the weld burrs are controlled. FIG. 4 is an enlarged essential-part cross section showing a weld burr restriction member formed integrally with a friction welding table. FIG. 5 is an essential-part plan view showing the shape of the projecting weld burrs. FIG. 6 is a schematic view showing the construction of the airbag apparatus.

The mechanical ignition type airbag inflator of FIG. 1 incorporating a mechanical sensor has its housing 1 formed by friction-welding a diffuser shell 2 having gas discharge ports 4 and a closure shell 3 having a sensor accommodating opening 7. The interior of the housing 1 is divided by partition walls 22, joined by friction welding, into two chambers, namely an ignition means accommodating chamber 8 and a combustion chamber 9. In the ignition means accommodating chamber 8 is installed ignition means which comprises a detonator piece 11 having a detonator 10 installed and fixed in a recess 17 and a transfer charge 12, and a sensor 6 arranged on the upper and lower side of the detonator piece 11, respectively. Weld burrs 23 projecting from the Joint of the partition walls 22 on the side of the ignition means accommodating chamber 8 are controlled in their shape by the weld burr restriction member 25. In FIG. 1, reference number 19 represents a safety device, and 21 a combustion ring.

The detonator 10, installed and fixed in the recess 17 of the detonator piece 11, contains a powdered tricinate-based agent. The opening of this recess 17 is attached with an aluminum tape 16 to seal the detonator D against moisture. The combustion chamber 9 contains a non-azide gas generating agent 13 and a coolant 14/filter 15 in the form of annular laminated layers of wire mesh made of stainless steel enclosing the gas generating agent.

In this airbag inflator, when the sensor 6 detects an impact, it launches a plunger 18 to pierce into the detonator 10 installed and fixed in the recess 17 of the detonator piered 11. When pieced by the plunger 18, the detonator 10 ignites and burns, with the detonator flames passing through a transfer hole 24 of the detonator piece 11 to fire and burn a transfer charge 12. The flame of the transfer charge 12 passes through a through hole 20 to burn the gas generating agent 13 which in turn produces a gas. The generated gas is cooled by the coolant 14 and then purified by the filter 15 before being ejected from the gas discharge ports 4.

FIG. 2 is an essential-part vertical cross section showing the ignition means of this invention. The ignition means comprises a mechanical sensor 6, a detonator 10 and a transfer charge 12. The mechanical sensor 6 contains a weight (not shown) that is moved by an acceleration occurred at time of collision and a plunger 18 that is prompted to shoot by the movement of the weight. The mechanical sensor 6 also has a safety device 19. Because the safety device 19 while in operation prevents the plunger 18 from being shot erroneously, the completed sensor 6 can be installed safely. There is no danger of the airbag inflator easily firing before the mechanical sensor 6 has been incorporated and thus the airbag inflator can be manufactured and handled safely and easily. In the mechanical ignition type airbag inflator of this embodiment, the mechanical sensor 6 of the ignition member is installed at the joint of the partition walls 22 on the side of the ignition means accommodating chamber 8. The mechanical sensor 6 is formed with a positioning portion 26 on its outer circumferential surface. The sensor 6 has its positioning portion 26 engaged with the weld burrs 23, whose protruding shape is controlled by the weld burr restriction member, to prevent the rotation of the sensor so that the plunger 18 reliably pierces the detonator 10. The control of the projection shape of the weld burrs 23 by the weld burr restriction member 25 involves, as shown in FIG. 3, inserting the weld burr restriction member 25, slightly larger in diameter than the mechanical sensor 6, into the ignition means accommodating chamber 8 during the friction welding of the partition walls 22 and, after the partition walls 22 are joined by friction welding, removing the weld burr restriction member 25. The weld burr restriction member 25, as shown in FIG. 4, may be formed integrally with a friction welding table that is used when friction-welding the housing.

The positioning of the sensor by the weld burrs involves controlling the shape of the protruding weld burrs 23 by using the weld burr restriction member 25 to form a hollow portion 27 in the ignition means accommodating chamber 8 into a shape having projections as shown in FIG. 5(*a*) or into a polygonal shape as shown in FIG. 5(*b*), and fitting into the hollow portion 27 the mechanical sensor 6 having the positioning portion 26 so shaped as to fit complementarily with the hollow portion 27 of FIGS. 5(*a*) and 5(*b*).

FIG. 6 shows the construction of the airbag apparatus, which comprises an airbag inflator of this invention, an airbag 100 (parts of bag), and a module case 101. The gas discharged from the gas discharge ports 4 of the airbag inflator spouts out into the airbag 100, which in turn inflates breaking a module cover 102 to form a shock absorbing cushion between a steering wheel 103 and a passenger.

The airbag inflator used in this embodiment is the one explained by referring to FIGS. 1 to 3.

The module case 101 is formed of, for example, a polyurethane and includes the module cover 102. The module case 101 accommodates the airbag 100 and the airbag inflator and forms a pad module, which is mounted in the steering wheel 103 of a car.

The airbag 100 is formed of nylon (for example, nylon 66) or polyester and its bag opening encloses the gas discharge ports 4 of the airbag inflator. The airbag 100 in a folder state is secured to a flange portion of the airbag inflator.

With this invention, the airbag inflator having the construction described above can obviate the need for the space in the housing for weld burrs formed by friction welding and also the need for the process of removing the weld burrs thereby reducing the overall size of the airbag inflator and preventing the airbag inflator from being disturbed by the removed weld burrs. Further, in the mechanical ignition type airbag inflator, in particular, the protruding weld burrs can effectively be utilized by controlling the shape of the protruding weld burrs.

What is claimed is:

1. A method of friction welding a first wall provided within a housing of an airbag gas generator to a second wall provided within the housing, the first and second walls defining a chamber for accommodating an igniter therein, comprising:

placing the first wall in contact with the second wall to form the chamber;

inserting a weld burr restriction member into the chamber;

friction welding the first and the second walls by rotating the first wall with respect to the second wall while the weld burr restriction member is being inserted into the chamber such that formation of welding burrs inside the chamber is restricted to provide a space to insert and accommodate the igniter in the chamber after the friction welding; and removing the weld burr restriction member from the chamber after the friction welding.

2. The method of claim 1, further comprising: inserting the igniter in the chamber after said removing step.

3. The method of claim 1, wherein said inserting step includes the step of, providing the weld burr restriction member having an external shape corresponding to an external shape of the igniter such that the igniter can be positioned within the chamber by the weld burrs.

4. The method of claim 1, wherein said inserting step includes the step of, inserting the weld burr restriction member having an external shape such that the weld burrs formed by the friction welding step prevent rotation of the igniter when the igniter is inserted in the chamber.

5. The method of claim 3, wherein said providing step includes the step of, providing at least one projection at a circumferential surface of said weld burr restriction member such that the formed weld burr has at least one indent that engages a protrusion provided on a peripheral surface of the igniter.

6. The method of claim 4, wherein said providing step includes the step of,
providing at least one projection at a circumferential surface of said weld burr restriction member such that the formed weld burr has at least one indent that engages a protrusion provided on a peripheral surface of the igniter.

7. The method of claim 2, wherein said inserting step includes the step of inserting an igniter having a mechanical-type sensor that launches a plunger towards a detonator provided within the housing upon detecting an impact.

8. The method of claim 1, wherein said inserting step includes the step of inserting the weld burr restriction member formed integrally with a friction welding table for friction welding the first and second walls.

9. The method of claim 1, wherein said first and second walls further define a combustion chamber within the housing.

10. The method of claim 1, wherein said weld burr formed in an inside of the chamber is shaped by said weld burr restriction member during a friction welding to function at least one of positioning and preventing a rotation of the igniter when the igniter is inserted into the chamber after the friction welding.

11. A method of friction welding a first wall provided within a housing of an airbag gas generator to a second wall provided within the housing, the first and second walls defining a chamber for accommodating an igniter therein, comprising:
placing the first wall in contact with the second wall to form the chamber;
inserting a weld burr restriction member into the chamber; and
friction welding the first and second walls by rotating the first wall with respect to the second wall while the weld burr restriction member is being inserted into the chamber such that formation of weld burrs inside the chamber is restricted to provide a space to accommodate the igniter in the chamber,
wherein said inserting step includes the step of,
inserting the weld burr restriction member having an external shape such that the weld burrs formed by the friction welding step prevent rotation of the igniter when the igniter is inserted in the chamber.

12. The method of claim 11, wherein said providing step includes the step of,
providing at least one projection at a circumferential surface of said weld burr restriction member such that the formed weld burr has at least one indent that engages a protrusion provided on a peripheral surface of the igniter.

13. A method of friction welding a first wall provided within a housing of an airbag gas generator to a second wall provided within the housing, the first and second walls defining a chamber for accommodating an igniter therein, comprising:
placing the first wall in contact with the second wall to form the chamber;
inserting a weld burr restriction member into the chamber; and
friction welding the first and second walls by rotating the first wall with respect to the second wall while the weld burr restriction member is being inserted into the chamber such that the formation of weld burrs inside the chamber is restricted to provide a space to accommodate the igniter in the chamber,
wherein said inserting step includes a step of,
providing the weld burr restriction member having an external shape that corresponds to an external shape of the igniter such that the igniter can be positioned within the chamber by the weld burrs,
wherein said providing step includes the step of providing at least one projection at a circumferential surface of the restriction member such that the formed weld burr has at least one indent that engages a protrusion provided on a peripheral surface of the igniter.

* * * * *